United States Patent [19]

Kanou et al.

[11] Patent Number: 4,722,565
[45] Date of Patent: Feb. 2, 1988

[54] TILT-SLIDE TYPE SUNROOF OF MOTOR VEHICLE

[75] Inventors: Noboru Kanou, Toyota; Mitsuyoshi Masuda, Kariya, both of Japan

[73] Assignee: Toyota Kidosha Kabushiki Kaisha, Japan

[21] Appl. No.: 833,234

[22] Filed: Feb. 27, 1986

[30] Foreign Application Priority Data

Feb. 28, 1985 [JP] Japan ................. 60-040123

[51] Int. Cl.⁴ .................. B60J 7/05; B60R 13/02
[52] U.S. Cl. .................... 296/221; 296/214; 160/95
[58] Field of Search ........ 296/211, 214, 216, 221–223; 49/62, 63; 160/95, 102, 103

[56] References Cited

U.S. PATENT DOCUMENTS

| 3,960,404 | 6/1976 | Bienert | 296/221 X |
| 4,179,156 | 12/1979 | Huisman | 296/216 |
| 4,596,419 | 6/1986 | Masuda | 296/221 |

FOREIGN PATENT DOCUMENTS

| 8107603 | 10/1981 | Fed. Rep. of Germany | 296/221 |
| 1511431 | 1/1968 | France | 296/216 |
| 61016 | 5/1977 | Japan . | |
| 54-34969 | 10/1979 | Japan . | |
| 56-157623 | 12/1981 | Japan . | |
| 89224 | 5/1984 | Japan | 296/216 |
| 59-100621 | 7/1984 | Japan . | |
| 2094723 | 9/1984 | United Kingdom | 296/221 |

Primary Examiner—Dennis H. Pedder
Attorney, Agent, or Firm—Parkhurst & Oliff

[57] ABSTRACT

A tilt-slide type sunroof of a motor vehicle having a sliding panel for opening or closing a roof opening formed in a roof panel. A housing is provided below the roof panel and separated therefrom, having a housing opening corresponding to the roof opening, and forming a space disposed rearwardly of the roof opening, capable of receiving the sliding panel in cooperation with the roof panel. A shade is provided on the sliding panel for covering the housing opening from above when the roof opening is closed by the sliding panel. The shade is constructed such that an intermediate portion in the longitudinal direction of the shade is made displaceable upward from the housing opening higher than a rear end portion of said shade, the length of the shade is such that when the intermediate portion of the shade is displaced upward, the rear end of the shade is positioned in the space.

5 Claims, 6 Drawing Figures

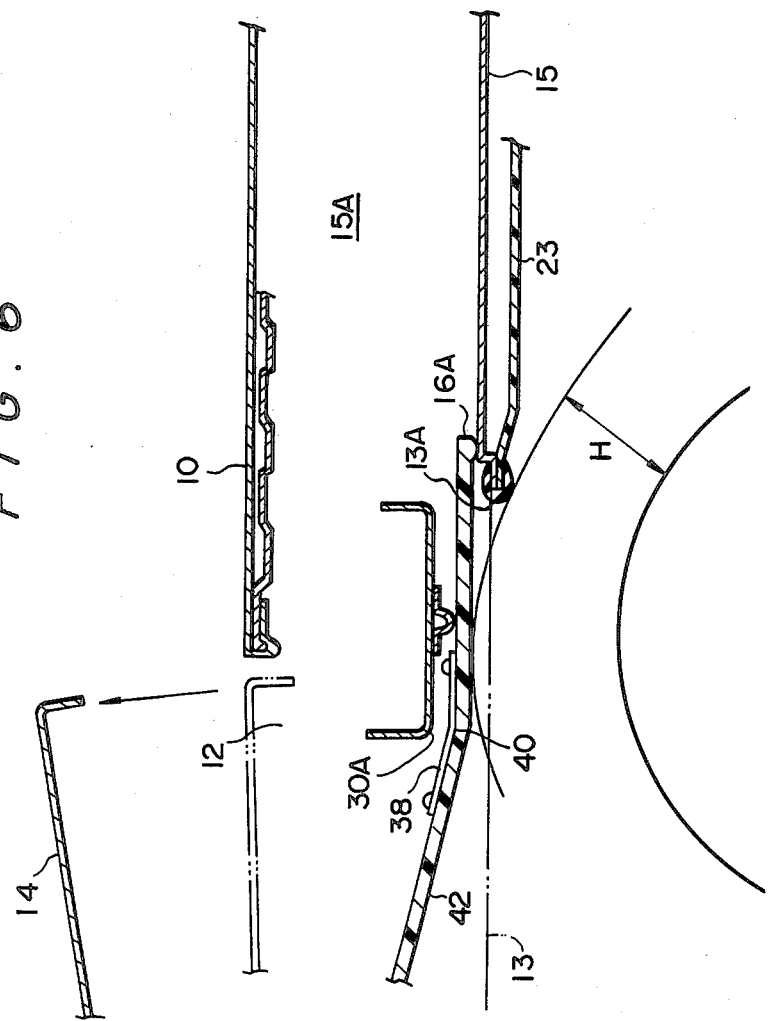

TILT-SLIDE TYPE SUNROOF OF MOTOR VEHICLE

BACKGROUND OF THE INVENTION

1. Field of the Invention

This invention relates to a tilt-slide type sunroof of a motor vehicle, and more particularly to a tilt-slide type sunroof of a motor vehicle, wherein a sliding panel and a shade are received in a housing disposed rearward of an opening in a roof so as to bring the sliding panel into the open position, and the sliding panel is rocked about the forward portion thereof to raise the rear portion thereof upward so as to bring the sliding panel into the tilt up position.

2. Description of the Prior Art As have heretofore been disclosed in Japanese patent Kokai (Laid Open) No. 157,623/81, Utility Model Kokai (Laid-Open) No. 100,621/84, Patent Kokoku (Post-Exam) No. 34,969/79, U.S. Pat. No. 4,179,156 and so forth, in a tilt-slide type sunroof, the rear end of the shade provided below the sliding panel is of such an arrangement that during tilt up, the shade is raised with the sliding panel opening so as to open the rear portion of a roof panel.

As a consequence, when the sun is positioned above the rear portion of the motor vehicle, if the sliding panel is tilted up the sun shines into a passenger compartment.

Ease of looking forward and passenger comfort are spoiled by this directly shining sunlight, reflected light and the like.

During tilt up, the rear end of the roof opening and a roof drip channel (hereinafter referred to as a "rain channel") provided at this rear end are fully exposed to view from the inside of the compartment, causing vision through the rear end of the opening and the aesthetic appearance thereof to be spoiled.

As disclosed in Japanese Patent Kokai (laid-Open) No. 61,016/77, U.S. Pat. No. 4,179,156 and so forth, the shade is divided into two parts along the longitudinal direction of the motor vehicle, and respective end portions of the shades thus divided are overlapped. In shade construction of this type, the connecting portion between the divided shades forms an uneven joint between a raised shade and a lowered shade. This restricts passenger vision and spoils the sunroof's aesthetic appearance.

SUMMARY OF THE INVENTION

It is the primary object of the present invention to provide a tilt-slide type sunroof of a motor vehicle, wherein during tilt up of the sliding panel the rear end portion of the opening of the roof panel can be concealed by the rear end portion of the shade, direct sunshine into the compartment can be avoided, vision through the rear end portion of the opening of the roof panel from the compartment is improved, and air in the compartment can be effectively ventilated.

To this end, the present invention contemplates a tilt-slide type sunroof of a motor vehicle, comprising: a sliding panel for opening or closing a roof panel of a vehicle; a housing provided below the roof panel and separated therefrom, having a housing opening corresponding to the roof opening, and forming a space disposed rearward of the roof opening, capable of receiving the sliding panel in cooperation with the roof panel; and a shade provided on the sliding panel for covering the housing opening from above when the roof opening is closed by the sliding panel. The sliding panel and the shade are received in the space so as to bring the sliding panel into the open position, and the sliding panel is rocked about the forward end portion thereof to raise the rear portion thereof upward so as to bring the sliding panel into the tilt up position. The shade is constructed such that an intermediate portion in the longitudinal direction of the shade is displaceable upward from the housing opening. The length of the shade in the longitudinal direction of the vehicle is such that when the intermediate portion of the shade is displaced upward, the rear end of the shade is positioned in the space disposed rearward of the housing opening. The shade is provided with means for displacing a portion of the shade from the housing opening so as to form spaces between the end edges of the housing opening in the widthwise direction of the vehicle and the end edges of the shade in the widthwise direction of the vehicle.

To the above end, the present invention contemplates that the shade is provided at substantially the central portion of the longitudinal direction of the vehicle and made bendable such that during tilt up of said sliding panel it bends along said bending line and is raised upward into a chevron or an inverted V shape.

To the above end, the present invention contemplates that the bending line is formed such that a front shade and a rear shade, which are separated from each other, are connected to each other through sheet spring-shaped connecting members provided on the exterior surfaces of the shades in such a manner that the interior surface of the shades are flush with each other.

To the above end, the present invention contemplates that the displacing means is constructed such that groove-shaped rails outwardly opening are provided at the end edges of the shade in the widthwise direction of the vehicle, close to the bending line and along the end edges, and engageable pins projected inwardly from links for the tilt up of the sliding panel are coupled into the groove-shaped rails.

To the above end, the present invention contemplates that the shade is provided at a position close to the rear end of the sliding panel with a bending line bendable into an upwardly chevron or inverted V shape.

To the above end, the present invention contemplates that the shade is a flexible sheet.

According to the present invention, the shade is formed such that the length of the shade in the longitudinal direction of the vehicle is longer than the length of the housing opening in the longitudinal direction of the vehicle so that, when the intermediate portion of the shade is displaced upward, the rear end of the shade can be positioned in the housing disposed rearward of the housing, thus concealing the rear end portion of the roof panel with the rear end portion of the shade. As a consequence, direct sunshine into the passenger compartment through the roof panel opening when the sliding panel is tilted up is blocked by the shade. Furthermore, the shape of the rear end portion of the roof opening and the rain channel provided in the rear end portion of the roof opening are not fully exposed to view from the inside of the compartment.

Furthermore, the shade is provided with means for displacing the intermediate portion of the shade upward through the housing opening in operational association with the tilt up of the sliding panel, whereby the rear end of the roof opening is concealed during tilt up and the space formed beween the opposite end edges of the shade in the widthwise direction of the vehicle and the end edges of the housing opening opposed to the aforesaid end edges is utilized to effectively ventilate the compartment.

BRIEF DESCRIPTION OF THE DRAWINGS

FIG. 6 is an enlarged sectional view thereof.

DETAILED DESCRIPTION OF THE PREFERRED EMBODIMENT

A description will now be given of the first embodiment of the present invention with the references to the drawings.

Figure 1:
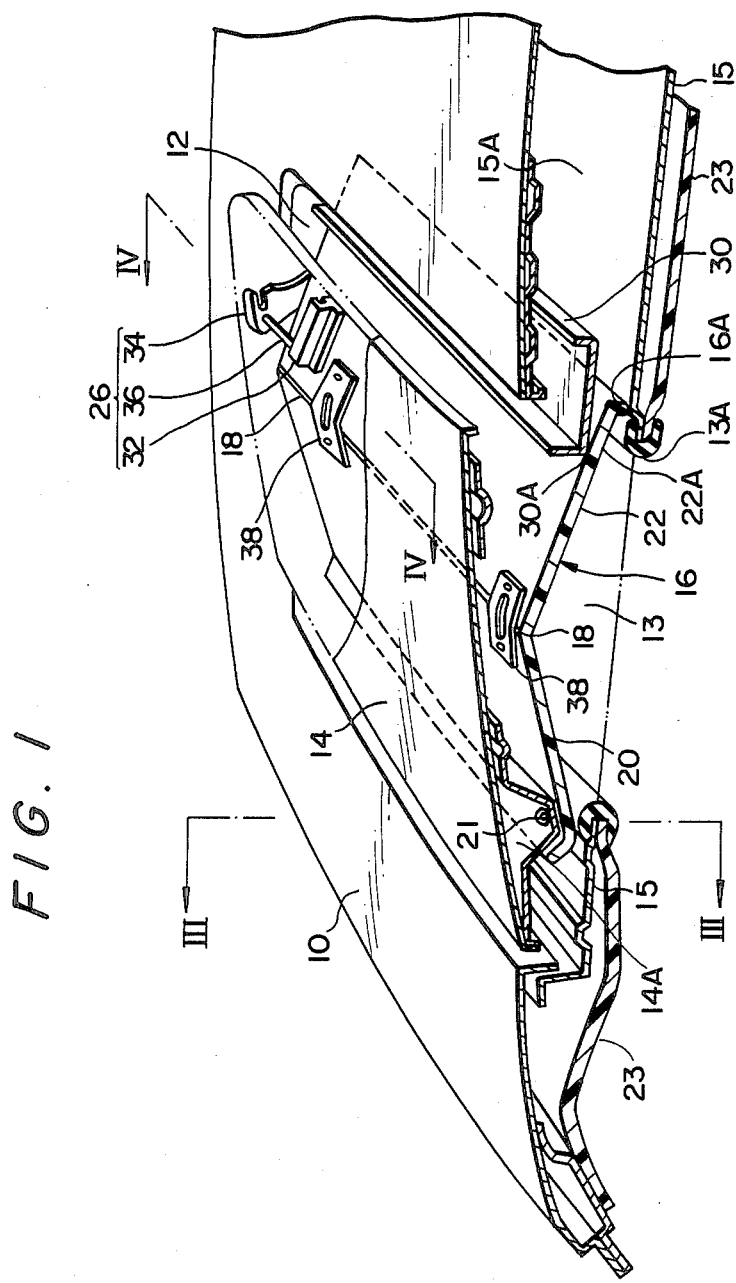
FIG. 1 is a partially perspective view showing one embodiment of the tilt-slide type sunroof of a motor vehicle according to the present invention.

FIG. 1 shows a tilt-slide type sunroof of a motor vehicle, comprising: a sliding panel 14 for opening or closing a roof opening 12 in a roof panel 10 of a motor vheicle; a housing 15 provided below the roof panel 10 and separated therefrom, having an opening 13 corresponding to the roof opening 12, and forming a space 15A disposed rearward of the roof opening 12, capable of receiving the sliding panel 14 in cooperation with the roof panel 10; and a shade 16 provided on the sliding panel 14 for covering the housing 15 from above when the opening 12 of the roof panel 10 is closed by the sliding panel 14. The sliding panel 14 and the shade 16 are received in the space 15A so as to bring the sliding panel 14 into the open position, and the sliding panel 14 is rocked about the forward end portion thereof to raise the rear portion thereof upward so as to bring the sliding panel 14 into the tilt up position. The shade 16 is constructed such that an intermediate portion in the longitudinal direction of the shade 16 is made upwardly displaceable from the housing opening 13. The length of the shade 16 in the longitudinal direction of the vehicle is such that when the intermediate portion of the shade 16 is displaced upward, the rear end 16A of the shade 16 is positioned in the space 15A disposed rearward of the rear end 13A of the housing opening 13. The shade 16 is provided with displacing means 26 operationally associated with the tilt up of the sliding panel 14 and displacing the portion of the shade 16 from the housing opening 13 so as to form spaces between the end edges of the housing opening 13 in the widthwise direction of the vehicle and the end edges of the shade 16 in the widthwise direction of the vehicle.

Figure 3:
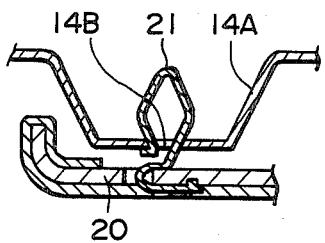
FIG. 3 is an enlarged sectional view taken along the line III—III in FIG. 1.

In FIG. 3, 14A designates a reinforcement provided on the rear surface of the sliding panel 14 in the widthwise direction of the vehicle. Clips 21 are coupled into mounting holes 14B formed in this reinforcement 14A, whereby a front shade 20 is secured to the sliding panel 14 by the clips 21.

In FIG. 1, shade 16 is provided at substantially the central portion of the longitudinal direction of the vehicle with a bending line 18 disposed in the widthwise direction of the vehicle. The bending line 18 is formed such that a front shade 20 and a rear shade 22 are connected to each other by sheet spring-shaped connecting members 38 provided on the exterior surface of these shades 20 and 22 in such a manner that the exterior surface of the front and rear shades 20 and 22 are flush with each other.

Abutted against the top surface of the rear shade 22 at a position close to the rear end of the rear shade 22 is the lower forward portion 30A of the rain channel 30 provided on the sliding panel 14 in the housing 15 in the widthwise direction of the vehicle at a position below the rear edge of the opening 12 of the roof panel 10, so that the rear end portion of the rear shade 22 can be pressed downward during the upward displacement of shade 16.

The displacing means 26 is of such an arrangement that outwardly opening groove-shaped rails 32 are provided at the end edges of the shade 16 close to the bending line 18 and along the top surface of the shade 16. Engageable pins 36 are projected inwardly from links 34 for the tilt up of the sliding panel 14 and coupled with the groove-shaped rails 32.

Figure 4:
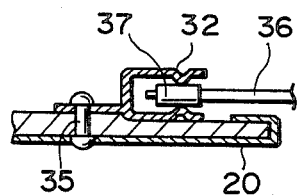
FIG. 4 is an enlarged sectional view taken along the line IV—IV in FIG. 1.

FIG. 4 shows the means by which the engageable pin 36 is rotatably coupled with a cylinder 37 made of synthetic resin or the like, whereby the movement of the engageable pin 36 in the rail 32 is facilitated. Designated at 35 is a rivet for securing the rail 32 to the shade 16.

Both the mechanism for tilting the sliding panel 14 of FIG. 1 up or down and the mechanism for causing the sliding panel 14 to slide together with the shade 16 and the rain channel 30 in the longitudinal direction are well known, so that only the link 34 for the tilt up is shown and the drawings and description of other arrangements will be omitted.

According to the first embodiment, when the sliding panel 14 is rocked upward about the forward end portion thereof and the links 34 tilted up due to the action of a tilt up mechanism, not shown, the groove-shaped rails 32 engage with the engageable pins 36 of the tilt up links 34 and are pushed upward by the engageable pins 36.

The forward end portion of the front shade 20 is fixed to the forward end portion of the sliding panel 14 and the rear end portion 22A of the rear shade 22 is pressed downward by the rain channel 30. Due to the upward displacement of the groove-shaped rails 32, the bending line 18 of the shade 16 is displaced upward as the sliding panel 14 is tilted up. The shade 16 as a whole is bent into a shallow chevron or inverted V shape as viewed sideways and the rear end 16A of the shade 16 is positioned in the space 15A disposed rearward of the rear end edge 13A of the housing opening 13.

With the above-described arrangement, the rear end portion of the opening 12 of the roof panel 10 is concealed by the rear end portion 22A of the rear shade 22, so that during tilt up the passenger compartment can avoid being exposed directly to sunlight through the roof panel opening 12, and the rear end portion of the opening 12 is not fully exposed to view from the inside of the compartment.

Figure 2:
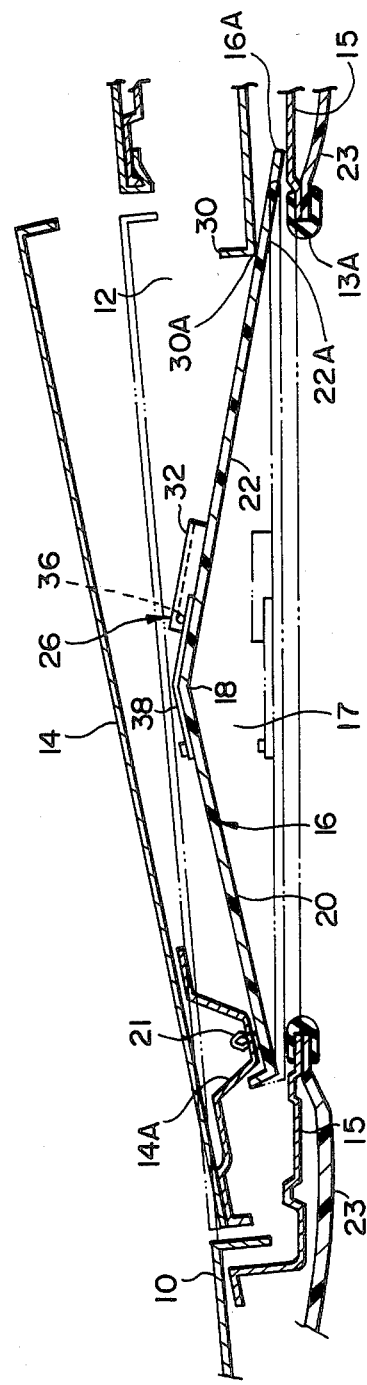
FIG. 2 is a sectional view showing the essential portions thereof.

The shade 16 is bent into the shallow or inverted V shape such that triangular spaces 17 of FIG. 2 are formed between the opposite end edges of the shade 16 in the widthwise direction of the vehicle and the opposite end edges of the housing openings 13 of FIG. 1 in the widthwise direction of the vehicle, so that air can be effectively ventilated in the compartment through these spaces 17. In other words, even when the rear end portion of the opening 12 is concealed by the rear end portion 22A of the rear shade 22, the ventilation performance is not impaired.

In the first embodiment, the displacing means 26 of the shade 16 consists of groove-shaped rails 32 provided on the top surface of the shade 16 close to the bending line 18 and the engageable pins 36 of the links 34 so that the bending line 18 of the shade 16 can be reliably raised during tilt up.

Furthermore, the rain channel 30 provided on the sliding panel 14 at the rear end of the roof opening 12 is utilized so as to abut the top surface of the rear end portion 22A of the rear shade 22 against the rain channel 30 during tilt up, so that the rear end 22A of the rear shade 22 can constantly conceal the rear end of the roof opening 12 from below and rear end edge 13A of the housing opening 13 from above. Moreover, the effective utilization of the rain channel 30 can eliminate the necessity of forming the means for pressing the rear end of the shade 16 from separate parts, thus enabling non-complex construction thereof.

Figure 5:
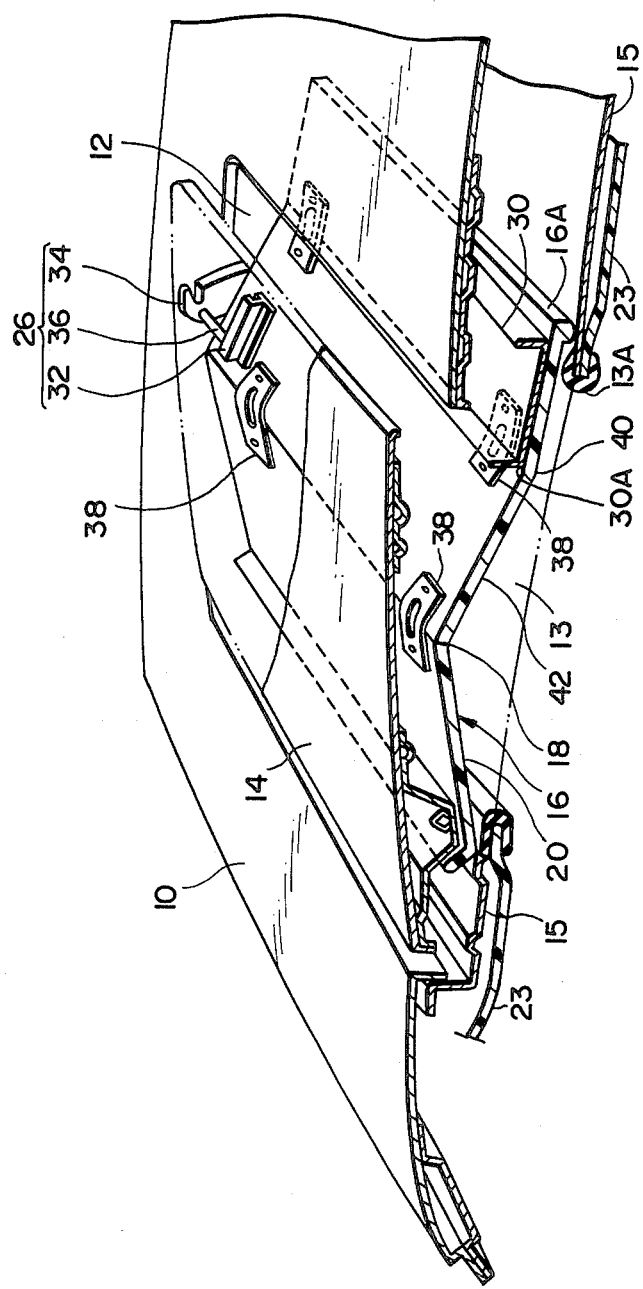
FIG. 5 is a partially perspective view showing a second embodiment.

As shown in FIGS. 5 and 6, according to the second embodiment a bending line 40, similar to the bending line 18, in a rear shade 42 is formed at a position below the lower forward end portion 30A of the rain channel 30 in the widthwise direction of the vehicle.

The rear shade 42 is separated into a front side and a rear side at the bending line 40. The front side and rear side are connected by sheet spring-shaped connecting members 38 at the bending line 40. Since the respects other than the above are similar to those in the first embodiment, detailed description will not be repeated.

This second embodiment can be effective when the rear end edge 13A of the housing opening 13 is positioned rearwardly as compared with the position where the rear end edge is formed in the first embodiment due to a head clearance H or the like, and a small clearance between the forward lower end portion 30A of the rain channel 30 and the top surface of the housing 15.

More specifically, with the rear shade 22 in the first embodiment, the lower forward end portion 30A of the rain channel 30 impedes the upward displacement of the bending line 18, such that shade 16 cannot be fully bent into the shallow chevron shape as viewed sideways. However, in the case of the second embodiment the rear shade 42 can be bent by way of the bending line 40, so that, due to the bending of the rear shade 42 along this bending line 40, the bending line 18 of the shade 16 can be positioned upwardly, and the shade 16 can be bent into the shallow chevron shape as viewed sideways. Consequently, the position where the rear end edge 13A of the housing opening 13 is not limited and an ideal sunroof can be designed.

Additionally, in the above embodiments the bending line 18 is formed by connecting the front shade 20 and the rear shade 22 or 42, which are separated from each other, by use of the sheet spring-shaped connecting members 38. However, the present invention need not necessarily be limited to this. For example, when the shade 16 is made of flexible synthetic resin or the like, a mere groove portion may be formed along the bending line 18. Furthermore, to cover a gap of the bending line 18 between the front and rear shades 20 and 22 (42), a lining formed of a fabric or the like may be applied to the surface of the shade 16 on the compartment's side. Additionally by not providing the bending lines 18 and 40 on the shade 16, the shade 16 may be formed of a flexible sheet, fabric or the like.

In the above embodiments, the pressing of the rear end 16A of the shade 16 is performed by the rain channel 30. However, the present invention need not necessarily to be limited to this. For example, rear end pins (not shown) projected outwardly in the widthwise direction of the vehicle and provided on opposite end portions of the rear end edge 22A of the rear shade 22 in the widthwise direction of the vehicle and rails for movably holding the aforesaid rear end pins in the longitudinal direction of the vehicle may perform the pressing.

In the above embodiments, the displacing means 26 consists of groove-shaped rails 32 provided on the top surface of the shade 16 and the engageable pins 36 projected from the links 34 for the tilt up and engageable with the groove-shaped rails 32. However, the present invention need not necessarily be limited to this. For example, the front shade 20 may be solidly secured to the undersurface of the sliding panel 14 through a holding member or the like. In this case, as the sliding panel 14 is tilted up, the front shade 20 is also tilted up, causing the shade 16 to be bent at the bending position of the bending line 18 into the shallow chevron or inverted V shape as viewed sideways. At this time, the connecting members forming the bending line 18 are constituted by the sheet springs bent into the chevron or inverted V shape in cross section, so that the resiliency of the connecting members is utilized to constantly abut the rear end of the shade against the top portion of the housing without using any other pressing means, thus enabling non-complex construction.

What is claimed is:

1. A tilt-slide type sunroof of a motor vehicle, comprising
a sliding panel for opening or closing a roof opening formed in a roof panel of a vehicle;
a shade provided on said sliding panel for covering a housing opening from above when said roof opening is closed by said sliding panel; wherein said sliding panel is rocked about a forward end portion thereof to raise a rear portion thereof upward so as to bring said sliding panel into a tilt up position;
a housing provided below said roof panel and separated therefrom, having said housing opening corresponding to said roof opening, and forming a space disposed rearward of the roof opening, capable of receiving said sliding panel and said shade in cooperation with said roof panel;
said shade being constructed such that an intermediate portion in the longitudinal direction of said shade is displaceable upward from the housing opening such that said intermediate portion forms an apex which is higher than a pivotable front portion and a pivotable rear portion thereof, the length of said shade in the longitudinal direction of the vehicle is such that when the intermediate portion of said shade is displaced upward, the rear end of said shade is positioned in said space as disposed rearwardly of the rear end of the housing opening;
said shade being provided thereon with displacing means for being operationally associated with the tilt up of said sliding panel and displacing the intermediate portion of said shade from the housing opening so as to form spaced between end edges of the housing opening in the widthwise direction of the vehicle and end edges of said shade in the widthwise direction of the vehicle.

2. A tilt-slide type sunroof of a motor vehicle as set forth in claim 1, wherein a bending line is provided at substantially a central portion of said shade, said shade being bendable along said bending line such that during tilt up of said sliding panel, said shade bends upwardly along said bending line and raises into a substantially inverted V-shape.

3. A tilt-slide type sunroof of a motor vehicle as set forth in claim 2, wherein said bending line is formed such that a front shade and a rear shade, which are separated from each other, are connected to each other through sheet spring-shaped connecting members provided on exterior surfaces of said shades in such a manner that interior surfaces of said shades are flush with each other.

4. A tilt-slide type sunroof of a motor vehicle as set forth in claim 2, wherein said displacing means is constructed such that outwardly opening groove-shaped rails are provided at the end edges of said shade in the widthwise direction of the vehicle, close to said bending line and along the end edges, and engageable pins projected inwardly from links for the tilt up of the sliding panel are coupled into the groove-shaped rails.

5. A tilt-slide type sunroof of a motor vehicle as set forth in claim 1, wherein said shade is provided at a position close to the rear end portion thereof with a bending line, said shade being bendable into a shallow V-shape at said bending line.

* * * * *

UNITED STATES PATENT AND TRADEMARK OFFICE
CERTIFICATE OF CORRECTION

PATENT NO. : 4,722,565

DATED : February 2, 1988

INVENTOR(S) : Noboru KANOU et al.

It is certified that error appears in the above-identified patent and that said Letters Patent is hereby corrected as shown below:

On the cover page, left column, change "[73] Assignee: Toyota Kidosha Kabushiki Kaisha, Japan"

to

--[73] Assignee: Toyota Jidosha Kabushiki Kaisha, and Aishin Seiki Kabushiki Kaisha, both of Japan --.

Signed and Sealed this

Thirteenth Day of September, 1988

Attest:

DONALD J. QUIGG

*Attesting Officer*  *Commissioner of Patents and Trademarks*